US 6,544,620 B2

(12) United States Patent
Weder

(10) Patent No.: US 6,544,620 B2
(45) Date of Patent: *Apr. 8, 2003

(54) DECORATIVE GRASS FORMED OF CLOTH AND POLYMERIC FILM

(75) Inventor: Donald E. Weder, Highland, IL (US)

(73) Assignee: Southpac Trust International, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 10/195,026

(22) Filed: Jul. 9, 2002

(65) Prior Publication Data

US 2003/0014914 A1 Jan. 23, 2003

Related U.S. Application Data

(62) Division of application No. 09/636,539, filed on Aug. 10, 2000.

(51) Int. Cl.[7] .................................. B32B 30/00
(52) U.S. Cl. ........................................ 428/91
(58) Field of Search ................... 47/72; 428/91

(56) References Cited

U.S. PATENT DOCUMENTS

| 2,679,887 A | 6/1954 | Doyle et al. |
| 3,962,503 A | 6/1976 | Crawford |
| 4,199,627 A | 4/1980 | Weder et al. |
| 4,216,620 A | 8/1980 | Weder et al. |
| 5,076,874 A | 12/1991 | Weder |
| 5,088,972 A | 2/1992 | Parker |
| 5,120,382 A | 6/1992 | Weder |
| 5,156,702 A | 10/1992 | Weder |
| 5,173,352 A | 12/1992 | Parker |
| 5,307,606 A | 5/1994 | Weder |
| 5,345,745 A | 9/1994 | Weder |
| 5,388,386 A | 2/1995 | Weder |
| 5,443,670 A | 8/1995 | Landau |
| 5,448,875 A | 9/1995 | Weder |
| 5,493,809 A | 2/1996 | Weder et al. |
| 5,572,851 A | 11/1996 | Weder |
| 5,625,979 A | 5/1997 | Weder |
| 5,752,360 A | 5/1998 | Weder |
| 5,810,169 A | 9/1998 | Weder |
| 5,871,432 A | 2/1999 | Beierlorzer |
| 5,906,569 A | 5/1999 | Ratzel |
| 5,924,241 A | 7/1999 | Hodge |
| 5,941,020 A | 8/1999 | Weder |
| 6,299,960 B1 * | 10/2001 | Weder .................. 428/156 |
| 6,365,241 B2 * | 4/2002 | Weder .................. 428/17 |
| 6,406,651 B1 * | 6/2002 | Weder .................. 156/209 |
| 6,425,967 B1 * | 7/2002 | Weder .................. 156/219 |
| 6,436,324 B1 * | 8/2002 | Weder et al. ........... 264/132 |

* cited by examiner

Primary Examiner—Charles T. Jordan
Assistant Examiner—Francis T. Palo
(74) Attorney, Agent, or Firm—Dunlap, Codding & Rogers, P.C.

(57) ABSTRACT

Decorative grasses formed from a material constructed of a layer of cloth and a layer of polymeric film wherein at least a portion of the layer of polymeric film is laminated to the layer of cloth, as well as methods for forming same, are disclosed herein.

4 Claims, 9 Drawing Sheets

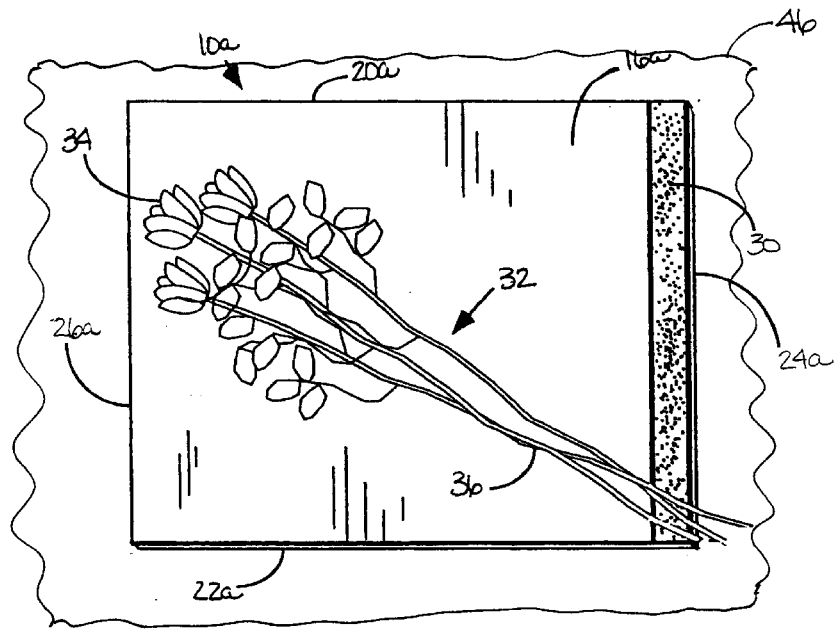
FIG. 4
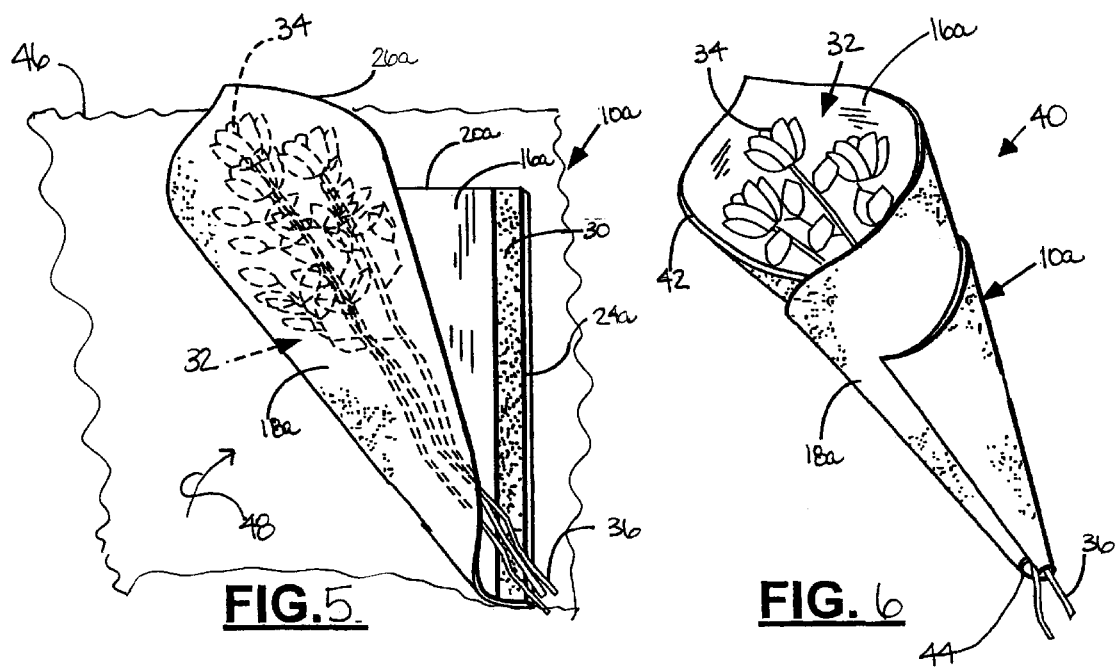
FIG. 5   FIG. 6

US 6,544,620 B2

DECORATIVE GRASS FORMED OF CLOTH AND POLYMERIC FILM

CROSS REFERENCE TO RELATED APPLICATIONS

This application is a divisional of U.S. Ser. No. 09/636,539, filed Aug. 10, 2000, entitled "WRAPPER FOR FLOWER POT".

STATEMENT REGARDING FEDERALLY SPONSORED RESEARCH OR DEVELOPMENT

Not applicable.

FIELD OF THE INVENTION

The present invention relates to methods for forming wrappers for flower pots and floral groupings, and more particularly but not by way of limitation, to methods for forming wrappers for flower pots and floral groupings from a sheet of material constructed from natural or synthetic fibers or combinations thereof in combination with at least one polymeric film.

BRIEF DESCRIPTION OF THE DRAWINGS

FIG. 4 is a perspective view of the sheet of material of FIG. 2 having a floral grouping disposed thereon.

FIG. 5 is a perspective view of the floral grouping of FIG. 4 being wrapped with the sheet of material of FIG. 2 by one method of wrapping.

FIG. 6 is a perspective view of a decorative cover for the floral grouping formed from the sheet of material of FIG. 2.

DETAILED DESCRIPTION OF THE INVENTION

Figure 18:
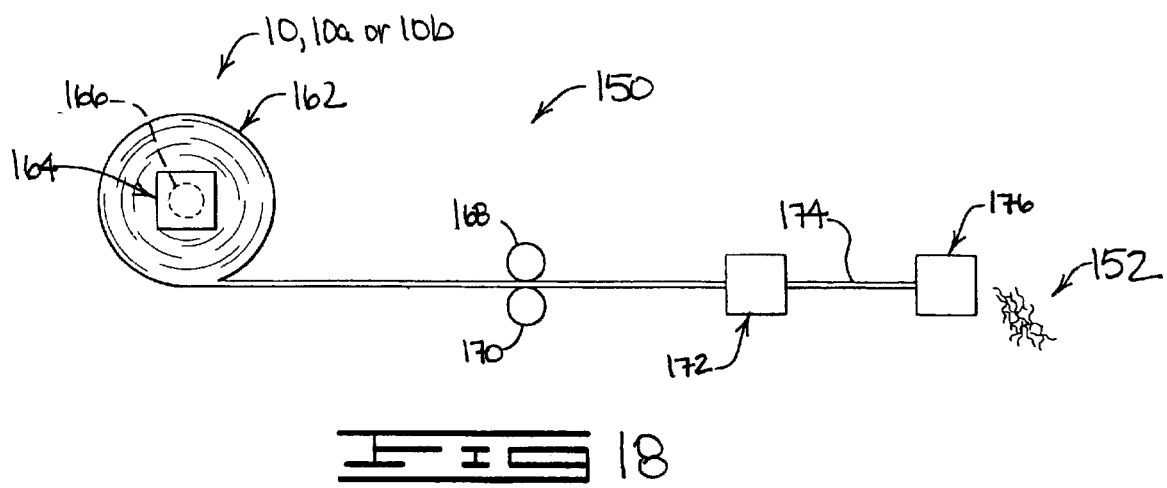
FIG. 18 is a schematic representation of a system for making decorative grass from a sheet of material constructed in accordance with the present invention.
Figure 19:
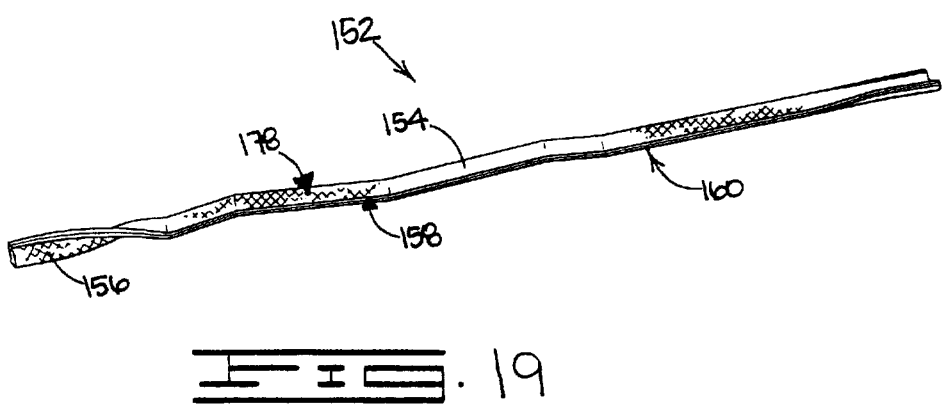
FIG. 19 is a perspective view of a segment of decorative grass produced from a sheet of material constructed in accordance with the present invention.

Sheets of material constructed in accordance with the present invention may be employed to provide a decorative cover for a floral grouping (FIGS. 4–7) or a decorative cover for a flower pot (FIG. 8); to provide a sleeve for wrapping or covering a floral grouping (FIGS. 10–13) or a flower pot (FIGS. 14–16); to provide a ribbon material (FIG. 17) or to produce decorative grass (FIG. 19). Such uses of the sheets of material of the present invention will be described in detail herein after with reference to FIGS. 4–19.

The term "flower pot" as used herein refers to any type of container for holding a floral grouping, a plant, or any another pot-type container. Examples of flower pots and/or pot-type containers include, but are not limited to, clay pots, wooden pots, plastic pots, pots made from natural and/or synthetic fibers, or any combination thereof. Such flower pots and/or pot-type containers are provided with a retaining space for receiving a floral grouping. The floral grouping may be disposed within the retaining space of the flower pot with a suitable growing medium, or other retaining medium, such as a floral foam. It will also be understood that in some cases the floral grouping, and any appropriate growing medium or other retaining medium, may be disposed in a sleeve formed from the sheet of material constructed in accordance with the present invention if the sleeve is adapted to contain a medium.

"Floral grouping" as used herein refers to cut fresh flowers, artificial flowers, a single flower or other fresh and/or artificial plants or other floral materials and may include other secondary plants and/or ornamentation or artificial or natural materials which add to the aesthetics of the overall floral grouping. Further, the floral grouping may comprise a growing potted plant having a root portion as well. However, it will be appreciated that the floral grouping may consist of only a single bloom or only foliage, a botanical item, or a propagule. The term "floral grouping" may be used interchangeably herein with the terms "floral arrangement", "botanical item" and/or "propagule."

The term "growing medium" when used herein refers to any liquid, solid or gaseous material used for plant growth or for the cultivation of propagules, including organic and inorganic materials such as soil, humus, perlite, vermiculite, sand, water, and including the nutrients, fertilizers or hormones or combinations thereof required by the plants or propagules for growth.

The term "botanical item" when used herein refers to a natural or artificial herbaceous or woody plant, taken singularly or in combination. The term "botanical item" also refers to any portion or portions of natural or artificial herbaceous or woody plants including stems, leaves, flowers, blossoms, buds, blooms, cones, or roots, taken singularly or in combination, or in groupings of such portions such as bouquets or floral groupings.

The term "propagule" when used herein refers to any structure capable of being propagated or acting as an agent of reproduction including seeds, shoots, stems, runners, tubers, plants, leaves, roots or spores.

Figure 1:
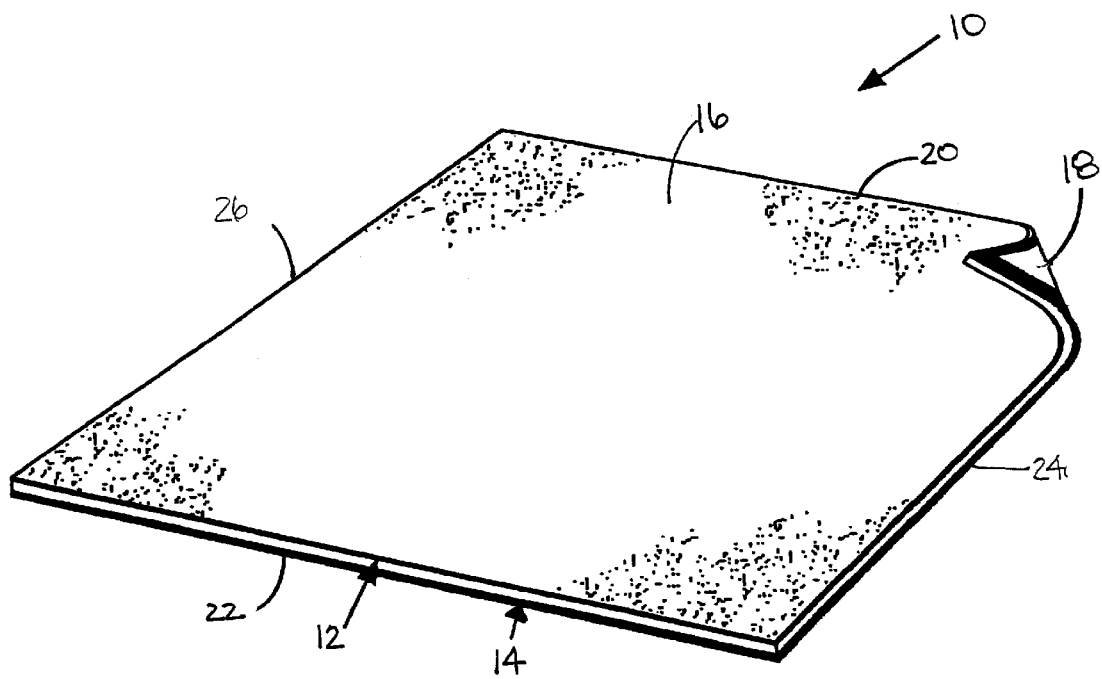
FIG. 1 is a perspective view of a sheet of material constructed in accordance with the present invention.
Figure 2:
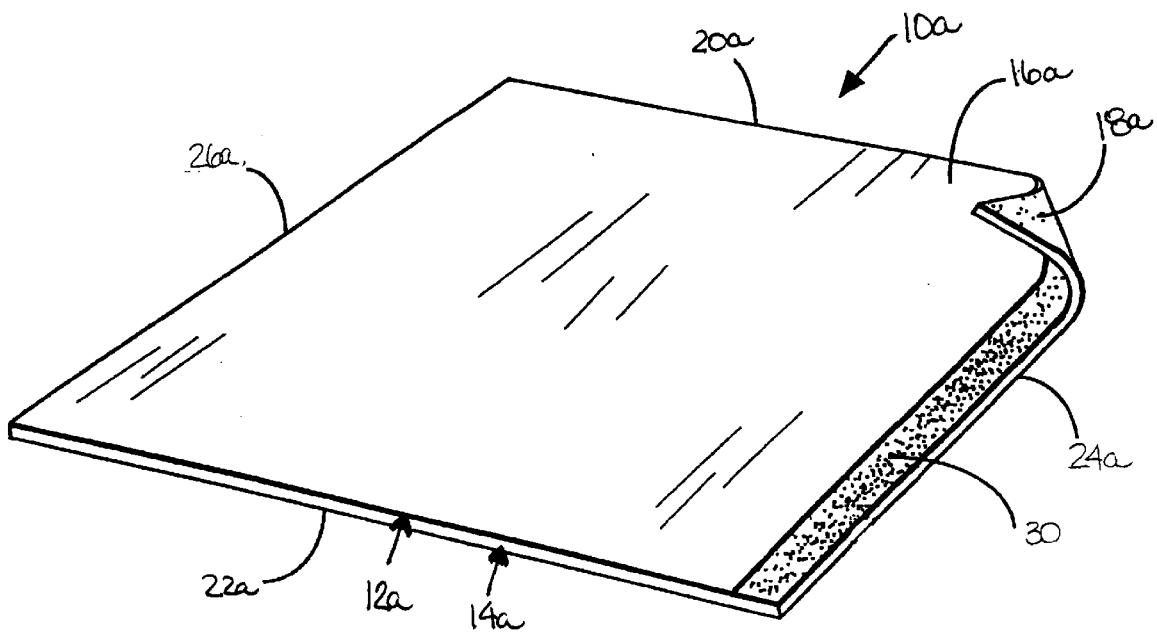
FIG. 2 is a perspective view of a sheet of material similar to the sheet of material of FIG. 1, the sheet of material having a bonding material disposed along one edge thereof.
Figure 3:
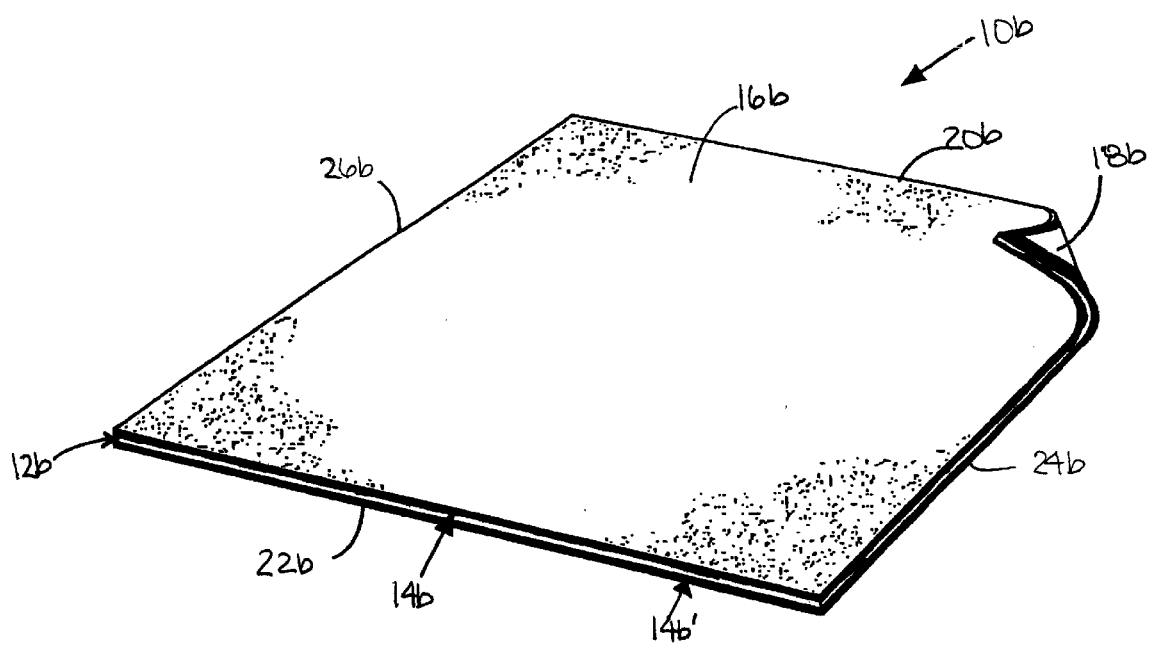
FIG. 3 is a perspective view of a sheet of material constructed in accordance with the present invention.

Description of FIGS. 1–3

Referring now to the Drawings, and more particularly to FIG. 1, shown therein is a sheet of laminated material 10 constructed in accordance with the present invention. The sheet of laminated material 10 comprises a layer of cloth 12 and a layer of polymeric film 14. The sheet of laminated material 10 has an upper surface 16, a lower surface 18, a first side 20, a second side 22, a third side 24 and a fourth side 26.

The layer of polymeric film 14 is laminated to the layer of cloth 12 by any method known in the art so that one surface of the laminated material 10, such as the upper surface 16, is cloth and the second surface of the laminated material 10, such as the lower surface 18, is polymeric film.

The term "cloth" as used herein will be understood to include any type of fabric material, including woven fabric, nonwoven fabric, welded fabric, spun bonded fabric, knitted fabric, pressed fabric, other types of fibrous material, and combinations thereof. Examples of cloth include fabrics formed from natural fibers such as cotton, wool, silk, hair, burlap, and linen, as well as synthetic fibers such as rayon and polyester, and blends thereof, such as denim.

The term "polymeric film" as used herein includes synthetic polymers such as polypropylene, polyethylene or polyvinyl chloride, extruded polymeric materials having an expanded core such as extruded polypropylene having an expanded core, naturally occurring polymers such as cellophane, and combinations thereof. The extruded polymeric material having an expanded core may also be referred to herein as an expanded core polymeric material.

"Extruded polymeric material having an expanded core" or "expanded core polymeric film" as used herein refers to any extrudable polymeric material or polymeric film in which the core is expanded during extrusion, such as by incorporation of a blowing agent in the polymeric resin which is being extruded.

The layer of polymeric film 14 may also be constructed, in whole or in part, from a cling material. "Cling material" when used herein refers to any material which is capable of connecting to the sheet of material and/or itself upon contacting engagement during the wrapping process and is wrappable about an item whereby portions of the cling material contactingly engage and connect to other portions of another material, or, alternatively, to itself, for generally securing the material wrapped about at least a portion of a flower pot. This connecting engagement is preferably temporary in that the material may be easily removed, i.e., the cling material "clings" to the flower pot.

As stated herein before, at least a portion of the layer of polymeric film 14 may be laminated to the layer of cloth 12 to form the sheet of laminated material 10 by any method known in the art. For example, U.S. Pat. No. 4,297,811 entitled "Laminated Printed Foil Flower Pot Wrap With Multicolor Appearance" issued to Weder on Nov. 3, 1981, which is hereby expressly incorporated herein by reference, describes a method for laminating two sheets of material using a bonding material. The layer of polymeric film 14 may be laminated to the layer of cloth 12 using a colored adhesive so as to impart a desired color to the sheet of laminated material 10.

The sheet of laminated material 10 is illustrated as being square. It will be appreciated, however, that the sheet of laminated material 10 can be of any shape, configuration or size as long as the sheet of laminated material 10 is sufficiently sized and shaped to wrap and encompass a floral grouping or flower pot. For example, the sheet of laminated material 10 may have a rectangular, round, oval, octagonal or asymmetrical shape.

In addition, the layer of cloth 12 and the layer of polymeric film 14 may be any shape, configuration or size as long as the sheet of laminated material 10 formed therefrom can function as described herein. Further, the layer of cloth 12 and the layer of polymeric film 14 may have different shapes. In this manner, the sheet of laminated material 10 may be provided with various asymmetrical shapes.

The layer of cloth 12 may be substantially the same size as the layer of polymeric film 14, or the layer of cloth 12 may be substantially larger in width and/or length than the layer of polymeric film 14. For example, the layer of polymeric film 14 may only be present on the portion of the sheet of laminated material 10 which will form a base portion of a decorative cover so as to impart water impermeability to the base portion of the decorative cover, while the layer of cloth 12 may extend beyond the layer of polymeric film 14 and form a skirt portion of the decorative cover which serves only a decorative function and does not require water impermeability.

Further, multiple sheets of laminated material 10 may be used in a single circumstance to provide a decorative cover or sleeve for a floral grouping or a flower pot. Moreover, when multiple sheets of laminated material 10 are used in combination, the sheets of laminated material 10 need not be uniform in size or shape.

Any thickness or stiffness of the layer of cloth 12 and the layer of polymeric film 14 may be utilized in accordance with the present invention as long as the sheet of laminated material 10 can be wrapped about at least a portion of a floral grouping or a flower pot to form a decorative cover for the floral grouping or flower pot, or formed into a sleeve for wrapping or covering a floral grouping or a flower pot, or to provide a ribbon or decorative grass. Generally, the layer of cloth 12 will have a thickness in a range of from about 0.5 mil to about 30 mil, and desirably from about 0.6 mil to about 10 mil, and the layer of polymeric film 14 generally will have a thickness in a range of from about 0.5 mil to about 30 mil, and desirably from about 0.6 mil to about 2 mil. While the thickness of the sheet of laminated material 10 can vary widely and will generally depend on the thicknesses of the layer of cloth 12 and the layer of polymeric film 14, desirable results can be obtained where the sheet of laminated material 10 has a thickness in a range of from about 0.1 mil to about 30 mil, and desirably from about 0.5 mil to about 20 mil.

The sheet of laminated material 10 may vary in color, depending at least in part on the type of cloth utilized as the layer of cloth 12 from which the sheet of laminated material 10 is constructed. The layer of polymeric film 14 may be tinted, or the layer of polymeric film 14 may be laminated to the layer of cloth 12 using a tinted bonding material, which can also provide the sheet of laminated material 10 with various colors. Further, the sheet of laminated material 10 may have decorative patterns or designs which are provided on at least one surface thereof which may be provided by printing, embossing, matting, texturing, flocking, application of foamable lacquers or foamable inks, and variations thereof and combinations thereof.

Shown in FIG. 2 is a sheet of laminated material 10a constructed in accordance with the present invention. The sheet of laminated material 10a has an upper surface 16a, a lower surface 18a, a first side 20a, a second side 22a, a third side 24a and a fourth side 26a. The sheet of laminated material 10a is constructed of a layer of cloth 12a and a layer of polymeric film 14a.

A bonding material 30 is disposed on at least a portion of at least one of the upper and lower surfaces 16a and 18a of the sheet of laminated material 10a. The bonding material 30 is depicted in FIG. 2 as being disposed on the upper surface 16a of the sheet of laminated material 10a substantially adjacent the third side 24a and extending as a strip between the first and second sides 20a and 22a of the sheet of laminated material 10a. The bonding material 30 may cover a portion of the upper surface 16a and/or lower surface 18a of the sheet of laminated material 10a, or the bonding material 30 may entirely cover the upper surface 16a and/or lower surface 18a of the sheet of laminated material 10a. The bonding material 30 may be disposed on the upper surface 16a and/or lower surface 18a of the sheet of laminated material 10a in the form of a strip or in the form of spaced-apart spots. Methods for disposing a bonding material 30 on the sheet of laminated material 10a are described in U.S. Pat. No. 5,111,637, entitled "Method For Wrapping A Floral Grouping", issued to Weder, et al. on May 12, 1992, which is expressly incorporated herein by reference.

The term "bonding material" when used herein includes adhesives, such as pressure sensitive adhesives, cohesives or any combination thereof. Such bonding materials are known in the art and are commercially available. When the bonding material 30 is a cohesive, a similar cohesive material must be placed on the adjacent surface for bondingly contacting and bondingly engaging with the cohesive material.

The term "bonding material" also includes materials which are heat sealable and, in this instance, the adjacent portions of the material must be brought into contact and then heat must be applied to effect the seal. The term "bonding material" also includes materials which are sonically sealable and vibratory sealable. The term "bonding material" when used herein also includes a heat sealing lacquer or hot melt material which may be applied to the material and, in this instance, heat, sound waves, or vibrations, also must be applied to effect the sealing.

The term "bonding material" when used herein also includes any type of material or element which can be used to effect the bonding or connecting of the two adjacent portions of the sheet of laminated material 10a to effect the connection or bonding described herein. The term "bonding material" may also include ties, labels, bands, ribbons, strings, tapes (including single or double-sided adhesive tapes), staples or combinations thereof. Some of the bonding materials would secure the ends of the material while other bonding materials may bind the circumference of a cover, or a sleeve, or, alternatively and/or in addition, the bonding materials would secure overlapping folds in the material and/or sleeve.

Alternatively, a cold seal adhesive may be utilized as the bonding material 30. The cold seal adhesive adheres only to a similar substrate, acting similarly as a cohesive, and binds only to itself. The cold seal adhesive, since it bonds only to a similar substrate, does not cause a residue to build up on equipment, thereby both permitting much more rapid disposition and use of such equipment to form articles and reducing labor costs. Further, since no heat is required to effect the seal, the dwell time, that is, the time for the sheet of material to form and retain the shape of an article, such as a flower pot cover or flower pot, is reduced. A cold seal adhesive binds quickly and easily with minimal pressure, and such a seal is not readily releasable. This characteristic is different from, for example, a pressure sensitive adhesive.

The term "bonding material" when used herein also includes any heat or chemically shrinkable material, and static electrical or other electrical materials, chemical welding materials, magnetic materials, mechanical or barb-type fastening materials or clamps, curl-type characteristics of the film or materials incorporated in material which can cause the material to take on certain shapes, cling films, slots, grooves, shrinkable materials and bands, curl materials, springs, and any type of welding method which may weld portions of the material to itself or to the pot, or to both the material itself and the pot.

Shown in FIG. 3 is a sheet of laminated material 10b constructed in accordance with the present invention. The sheet of laminated material 10b has an upper surface 16b, a lower surface 18b, a first side 20b, a second side 22b, a third side 24b and a fourth side 26b. The sheet of laminated material 10b is constructed of a layer of cloth 12b and a first layer of polymeric film 14b and a second layer of polymeric film 14b'. The layer of cloth 12b is depicted as being disposed between the first and second layers of polymeric film 14b and 14b' such that the first layer of polymeric film 14b forms the upper surface 16b of the sheet of laminated material 10b and the second layer of polymeric film 14b' forms the lower surface 18b of the sheet of laminated material 10b.

The first and second layers of polymeric film 14b and 14b' may be substantially the same size, and the first and second layers of polymeric film 14b and 14b' may be substantially the same size as the layer of cloth 12b or larger or smaller than the layer of cloth 14b. Alternatively, the first and second layers of polymeric film 14b and 14b' may be different sizes, and each of the first and second layers of polymeric film 14b or 14b' may be substantially the same size as the layer of cloth 12b or larger or smaller than the layer of cloth 12b.

Description of FIGS. 4–7

FIGS. 4–6 illustrate the use of the sheet of laminated material 10a having the bonding material 30 disposed thereon for wrapping a floral grouping 32 having a bloom portion 34 and a stem portion 36 to provide a decorative cover 40 (FIG. 6) for the floral grouping 32. The decorative cover 40, which is provided with a substantially conical configuration, has an open upper end 42 and a lower end 44.

The bonding material 30 disposed on the sheet of laminated material 10a may have a backing or release strip (not shown). The backing or release strip may be left applied for a period of time to the bonding material 30 after it is disposed on the upper or lower surface 16a or 18a of the sheet of laminated material 10a prior to its use as a wrapping material in order to protect the bonding qualities of the strip of bonding material 30.

In operation, an operator may dispose the sheet of laminated material 10a on a support surface 46 whereby the upper surface 16a of the sheet of laminated material 10a contacts the support surface 46. The floral grouping 32 is placed upon the lower surface 18a of the sheet of laminated material 10a in a diagonal orientation. The sheet of laminated material 10a is then wrapped about the floral grouping 32 by the operator (FIGS. 5 and 6), the operator overlapping a portion of the sheet of laminated material 10a over another portion of the sheet of laminated material 10a. That is, for example, the operator places the second side 22a of the sheet of laminated material 10a over the floral grouping 32, as shown in FIG. 5. The operator continues to roll the floral grouping 32 and the sheet of laminated material 10a in the direction indicated by the arrow 48 toward the first side 20a of the sheet of laminated material 10a until the lower surface 18a of the sheet of laminated material 10a substantially adjacent the third side 24a thereof firmly engages the upper surface 16a of the sheet of laminated material 10a. In this position, the bonding material 30 on the lower surface 18a of the sheet of laminated material 10a contacts the upper surface 16a of the sheet of laminated material 10a to provide the decorative cover 40 which substantially encompasses and surrounds a substantial portion of the floral grouping 32.

FIG. 6 shows the floral grouping 32 wrapped in a conical fashion to provide the decorative cover 40 for the floral grouping 32. When the floral grouping 32 is wrapped in a conical fashion, the bloom portion 34 of the floral grouping 32 is exposed substantially adjacent the open upper end 42 of the decorative cover 40, and the stem portion 36 of the floral grouping 32 is exposed substantially adjacent the lower end 44 of the decorative cover 40.

Figure 7:
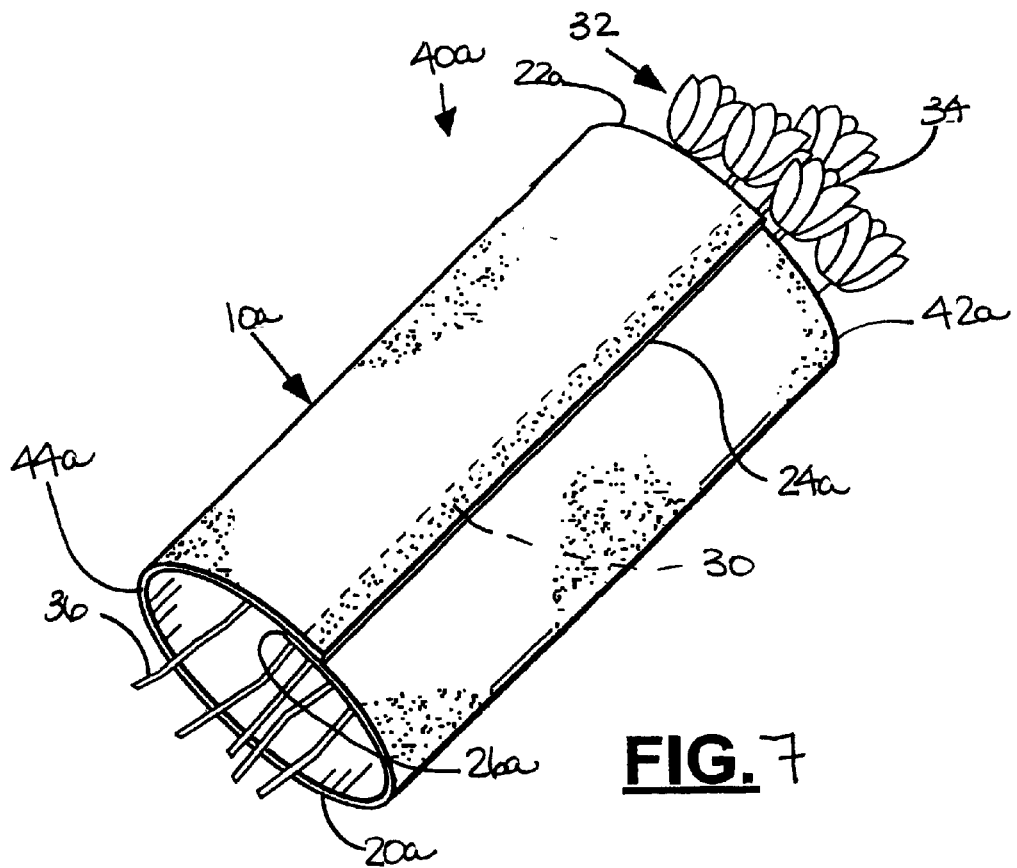
FIG. 7 is a perspective view of another embodiment of a decorative cover for the floral grouping formed from the sheet of material of FIG. 2.

In another embodiment, illustrated in FIG. 7, the sheet of laminated material 10a having the bonding material 30 disposed on the upper surface 16a thereof is utilized to wrap the floral grouping 32 in a cylindrical fashion to provide a decorative cover 40a for the floral grouping 32. The floral grouping 32 is disposed upon the sheet of laminated material 10a approximately parallel to the third side 24a of the sheet of laminated material 10a. The sheet of laminated material 10a is wrapped generally about the stem portion 36 of the floral grouping 32 to a position wherein the third side 24a of the sheet of laminated material 10a generally overlaps the fourth side 26a of the sheet of laminated material 10a in a cylindrical fashion. As before, the portion of the sheet of laminated material 10a substantially adjacent the third side 24a is disposed generally adjacent another portion of the sheet of laminated material 10a, such as the portion of the sheet of laminated material 10a substantially adjacent the fourth side 26a (as shown in FIG. 7), and the two adjacent portions then are brought into contact where they may be bondingly engaged via the bonding material 30, thereby securing the sheet of laminated material 10a generally about the floral grouping 32 so as to provide the decorative cover 40a for the floral grouping 32. The decorative cover 40a so formed is provided with an open upper end 42a and an open lower end 44a. However, it should be noted that the sheet of laminated material 10a may be wrapped a plurality of times about the stem portion 36 of the floral grouping 32 before the overlapping of the third side 24a and the fourth side 26a of the sheet of laminated material 10a to form the decorative cover 40a and, if desired the open lower end 44a of the decorative cover 40a may be closed such as by crimping and the like.

Figure 8:
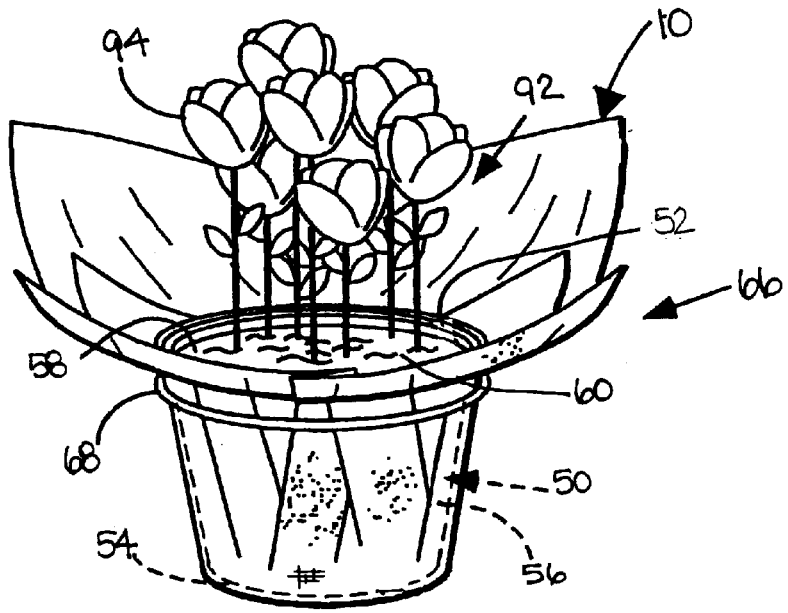
FIG. 8 is a perspective view of a decorative cover positioned about a flower pot wherein the decorative cover is formed from the sheet of material of FIG. 1.
Figure 9:
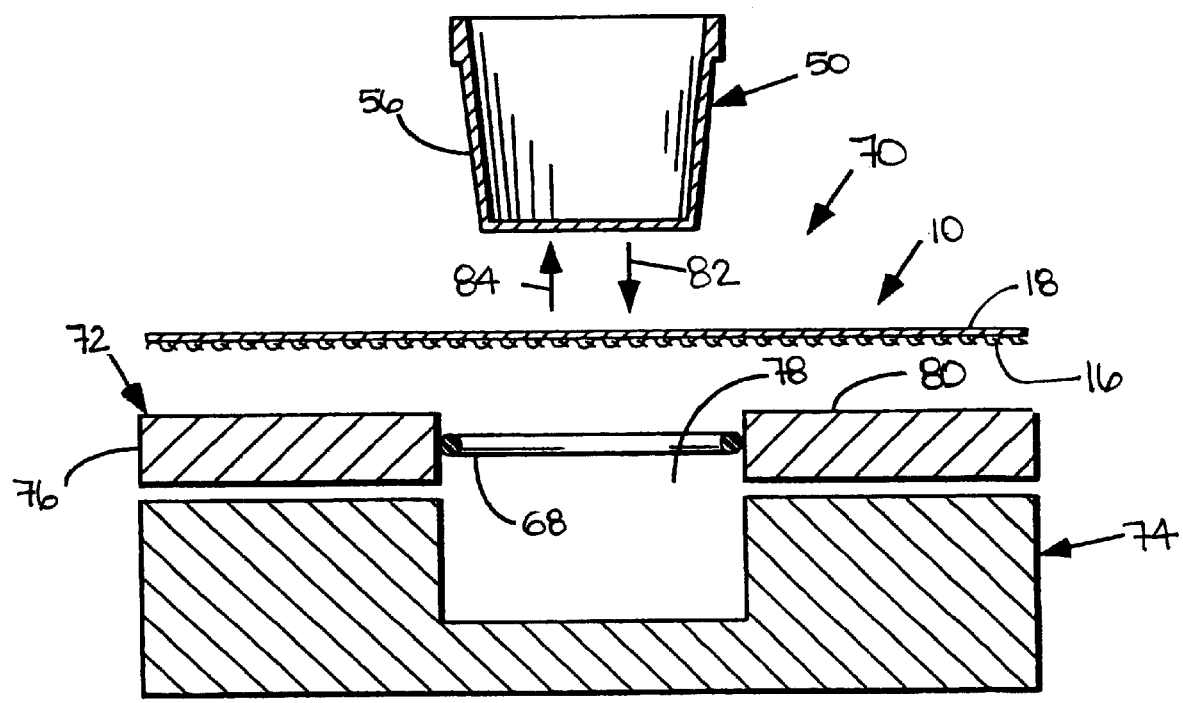
FIG. 9 is a cross-sectional view of a flower pot cover former and band applicator device having the sheet of material of FIG. 1 disposed above an opening in the flower pot cover former and band applicator device and having a flower pot disposed above the sheet of material.

Description of FIGS. 8–9

In another version of the invention, the sheet of laminated material 10 described hereinabove with reference to FIG. 1 may be used to wrap a flower pot or pot-type container. Shown in FIG. 8 is a flower pot 50 having an open upper end 52, a lower end 54, an outer peripheral surface 56, and an inner retaining space 58 within which may be disposed a growing medium 60 and a botanical item, such as a plant 62 having an upper portion 64 comprising blooms or foliage or both. The sheet of laminated material 10 is wrapped about the outer peripheral surface 56 of the flower pot 50 to provide a decorative cover 66.

Any one of numerous methods known in the art may be used to wrap the sheet of laminated material 10 about the flower pot 50 to form the decorative cover 66. For example, the sheet of laminated material 10 may be formed by hand about the outer peripheral surface 56 of the flower pot 50 to produce the decorative cover 66, which can then be secured about the flower pot 50 by a bonding material or by an elastic band 68 such that the open upper end 52 of the flower pot 50 remains substantially uncovered by the decorative cover 66 substantially as shown in FIG. 8.

Referring now to FIG. 9, a flower pot cover former and band applicator device 70 for forming the sheet of laminated material 10 into the decorative cover 66 for the flower pot 50 of FIG. 8 is illustrated. The flower pot cover former and band applicator device 70 comprises a band applicator 72 and a flower pot cover former 74. The flower pot cover former and band applicator device 70 has a support platform 76 with an opening 78 formed therein. A band, such as the elastic band 68, is disposed circumferentially about the opening 78 in the support platform 76.

The sheet of laminated material 10 is positioned on an upper surface 80 on the support platform 76 so as to be positioned over the opening 78 in the support platform 76. The upper surface 16 of the sheet of laminated material 10 is depicted as being positioned on the upper surface 80 of the support platform 76. However, it should be understood that the lower surface 18 of the sheet of laminated material 10 may be positioned on the upper surface 80 of the support platform 76.

The flower pot 50 is positioned above the sheet of laminated material 10 and is moved in a direction indicated by the arrow 82 into the opening 78 in the support platform 76 of the flower pot cover former and band applicator device 70. As the flower pot 50 is moved into the opening 78, the sheet of laminated material 10 is pressed about the outer peripheral surface 56 of the flower pot 50 thereby forming the decorative cover 66 about the flower pot 50. The decorative cover 66 is then secured about the flower pot 50 by the elastic band 68. The flower pot 50 having the decorative cover 66 secured thereto is then moved in a direction indicated by the arrow 84 out of the opening 78 in the support platform 76 of the flower pot cover former and band applicator device 70.

The elastic band 68 can be applied manually or automatically such as by the method shown in U.S. Pat. No. 5,105,599, issued to Weder et al. on Apr. 21, 1992, which is hereby expressly incorporated herein by reference. The elastic band 68 can also be applied as a tie using a method such as described in "Single Station Covering and Fastening System", U.S. Pat. No. 5,609,009, issued to Weder et al. on Mar. 11, 1997, the specification of which is hereby expressly incorporated herein by reference. The sheet of laminated material 10 can also be applied automatically about the flower pot 50, for example, by methods shown in U.S. Pat. Nos. 4,733,521 and 5,291,721, both of which are hereby expressly incorporated herein by reference.

Instead of securing the decorative cover 66 about the flower pot 50 via the elastic band 68, the decorative cover 66 formed from the sheet of laminated material 10 may be secured to the flower pot 50 by the use of one or more bonding materials. For example, the lower surface 18 of the sheet of laminated material 10 may have a bonding material such as the bonding material 30 disposed upon a portion thereof. When the sheet of laminated material 10 is disposed about the flower pot 50, at least a portion of the lower surface 18 of the sheet of laminated material 10 contacts the outer peripheral surface 56 of the flower pot 50 and is thereby bonded and held about the flower pot 50 via the bonding material 30.

Description of FIGS. 10–13

Figure 10:
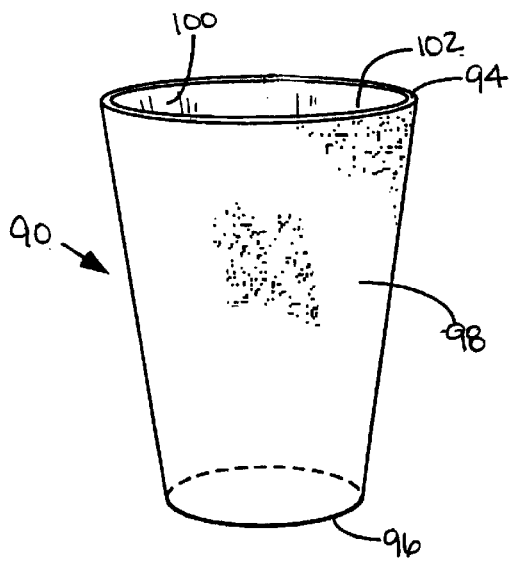
FIG. 10 is a perspective view of a floral sleeve constructed in accordance with the present invention.
Figure 11:
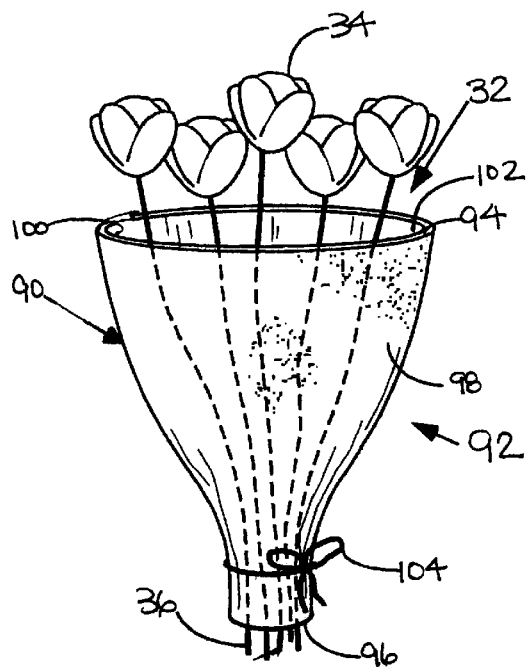
FIG. 11 is a perspective view of the floral sleeve of FIG. 10 disposed about a floral grouping.

Shown in FIG. 10 and designated therein by the general reference numeral 90 is a flexible bag or sleeve 90 constructed in accordance with the present invention. The sleeve 90 may be used as a decorative cover 92 for a floral grouping or a flower pot (FIG. 11). The sleeve 90 initially is in a flexible flattened state or condition which is openable to an open state or condition capable of receiving a floral grouping or a potted plant.

The sleeve 90 has an open upper end 94, a lower end 96 and an outer peripheral surface 98. The lower end 96 of the sleeve 90 may be open or closed with a bottom at the lower end 96. The sleeve 90 also has an inner peripheral surface 100 which defines and encompasses an inner retaining space 102. When the lower end 96 of the sleeve 90 is closed, a portion of the lower end 96 may be inwardly folded to form one or more gussets (not shown) for allowing the lower portion of the inner retaining space 102 to be expandable, for example, for receiving the circular bottom of a flower pot.

The sleeve 90 may be tapered outwardly from the lower end 96 toward a larger diameter at its upper end 94. In its flattened state the sleeve 90 generally has an overall cylindrical or frusto-conical shape, and when opened is substantially frusto-conical in configuration. It will be appreciated, however, that the sleeve 90 may have variations on the aforementioned shapes or may have significantly altered shapes such as square or rectangular or any geometric, non-geometric, asymmetrical and/or fanciful shape or configuration, as long as the sleeve 90 functions in accordance with the present invention in the manner described herein. The sleeve 90 may also be equipped with drain holes (if having a closed bottom) or side ventilation holes (not shown), or can be made from gas permeable or impermeable materials.

The sleeve 90 may be constructed from either of the sheets of laminated material 10 or 10b. Any thickness of the material from which the sleeve 90 is constructed may be utilized in accordance with the present invention as long as the sleeve 90 may be formed as described herein and as long as the sleeve 90 may contain at least a portion of a flower pot or a floral grouping, as described herein. Additionally, an insulating material such as bubble film can be utilized in order to provide additional protection for the item, such as a floral grouping, contained therein.

In FIG. 11 the sleeve 90 is illustrated as having the floral grouping 32 described hereinbefore with reference to FIGS. 4–7 disposed within the inner retaining space 102 of the sleeve 90. Generally, the bloom portion 34 of the floral grouping 32 is disposed substantially adjacent the open upper end 94 of the sleeve 90 and the stem portion 36 of the floral grouping 32 is disposed substantially adjacent the lower end 96 of the sleeve 90. Either end of the sleeve 90 may be closed about the floral grouping 32. Generally, a portion of the sleeve 90 is tightened about a portion of the stem portion 36 of the floral grouping 32 for holding the decorative cover 92 about the floral grouping 32. For example, the sleeve 90 may be held by a banding element 104 tied about the sleeve 90 such as is shown in FIG. 11. The step of tying the banding element 104 about a portion of the sleeve 90 results in a crimping of such portion of the sleeve 90 such that the crimped portion of the sleeve 90 substantially conforms to the stem portion 36 of the floral grouping 32. While the banding element 104 has been illustrated herein as a string or ribbon, it is to be understood that the banding element 104 can be elastic or non-elastic bands, elastic or non-elastic string, an elastic or non-elastic piece of material, a round piece of material, a flat piece of material, a ribbon, a piece of paper strip, a piece of plastic strip, a piece of wire, a tie wrap, a twist tie or combinations thereof.

Figure 12:
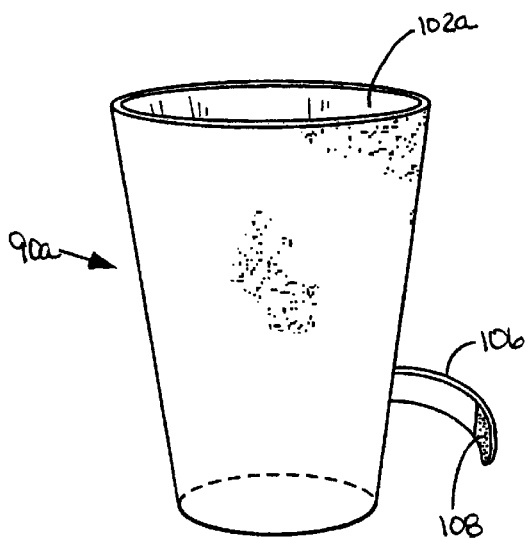
FIG. 12 is a perspective view of a floral sleeve constructed in accordance with the present invention, the floral sleeve having a cinching member.
Figure 13:
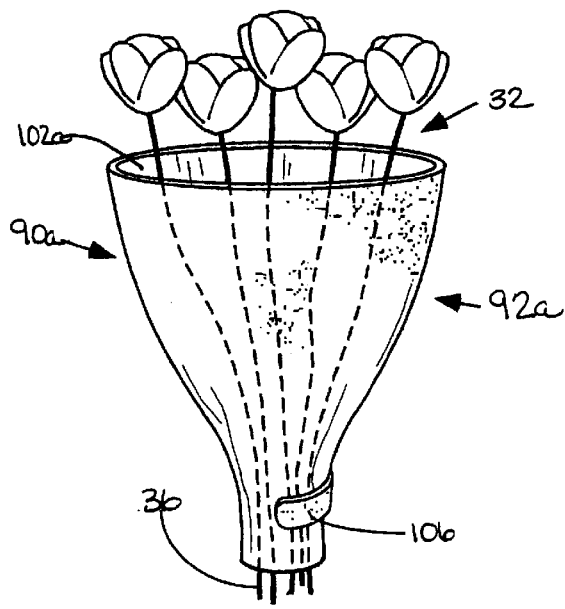
FIG. 13 is a perspective view of the floral sleeve of FIG. 12 disposed about a floral grouping.

Other methods for binding the sleeve 90 about the floral grouping 32 may be employed such as the bonding materials described elsewhere herein. For example, shown in FIG. 12 is a sleeve 90a which is substantially similar to the sleeve 90 described hereinbefore with reference to FIG. 10, except that the sleeve 90a also comprises a cinching tab 106 having a bonding material 108 disposed upon a surface thereof. Upon disposal of the floral grouping 32 in an inner retaining space 102a of the sleeve 90a, the cinching tab 106 can be used to gather portions of the sleeve 90a together about the stem portion 36 of the floral grouping 32 as shown in FIG. 13 and bondingly connected to the sleeve 90a for holding the sleeve 90a about the floral grouping 32, thereby forming a decorative cover 92a which is bound about the floral grouping 32.

Figure 14:
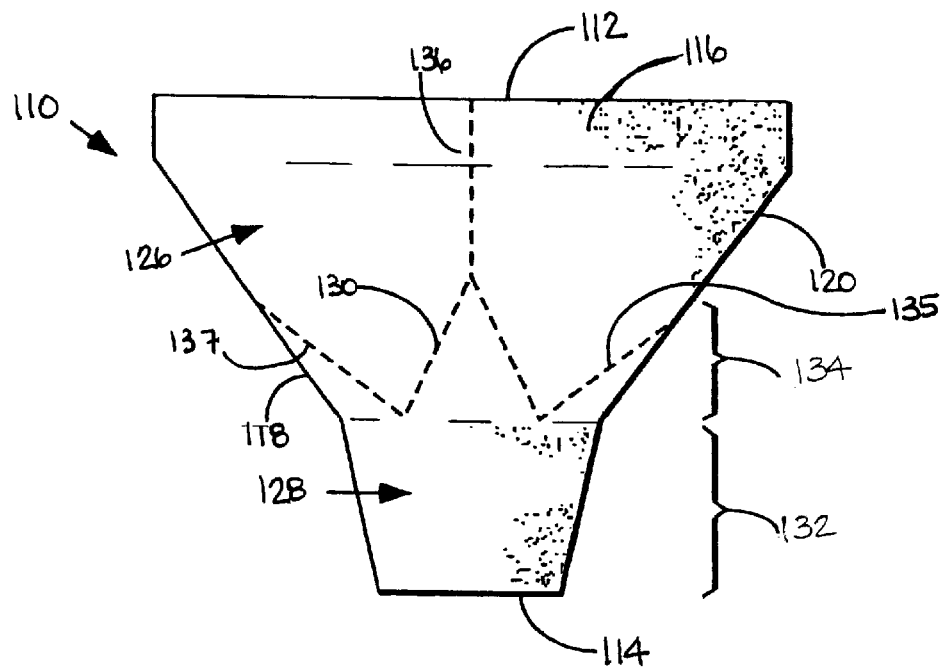
FIG. 14 is an elevational view of a sleeve having a detachable portion constructed in accordance with the present invention.
Figure 15:
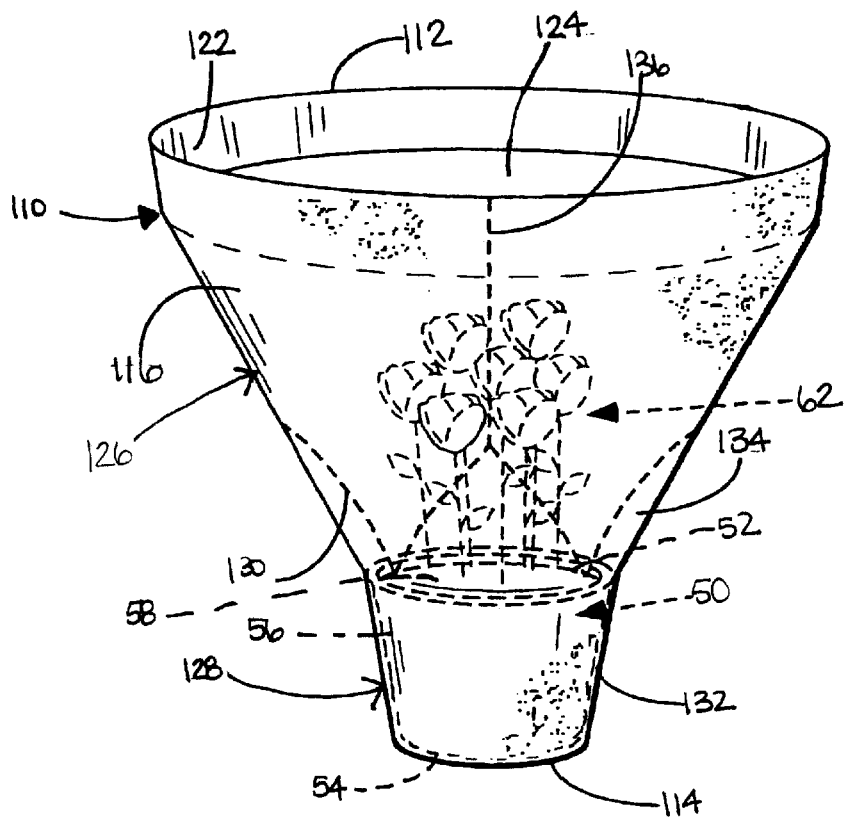
FIG. 15 is a perspective view of the sleeve of FIG. 14 having a flower pot disposed therein.
Figure 16:
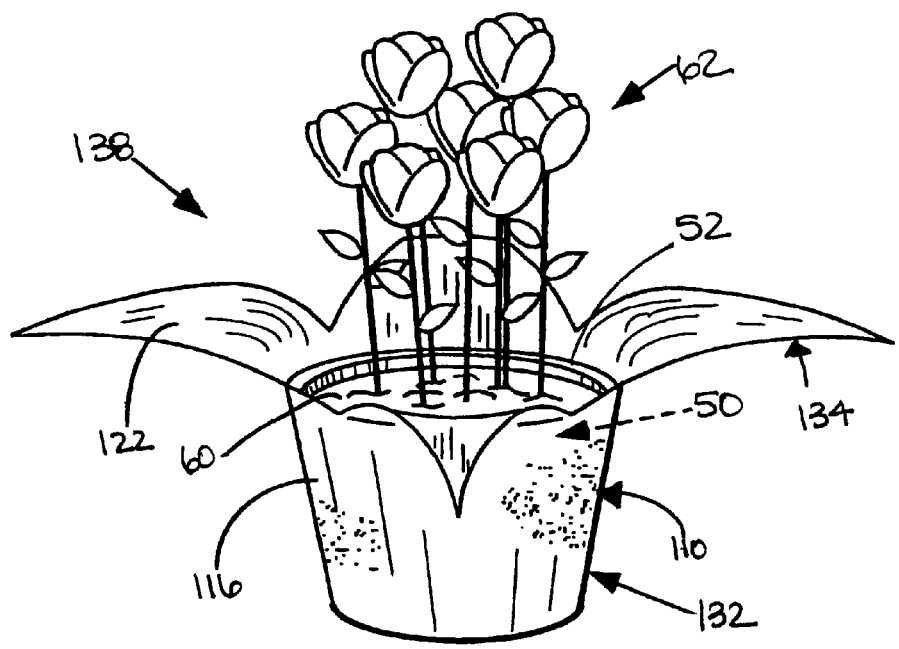
FIG. 16 is a perspective view of the flower pot disposed in the sleeve of FIG. 15 wherein an upper portion of the sleeve has been removed to provide a decorative cover having a skirt.

Description of FIGS. 14–16

Shown in FIGS. 14 and 15 is another embodiment of a sleeve designated by the reference numeral 110 and constructed in accordance with the present invention. The sleeve 110 may be constructed from a laminated material similar to the sheets of laminated material 10 or 10b described hereinbefore with reference to FIGS. 1–3. The sleeve 110 has one or more "detaching" elements in predetermined areas for detaching a portion of the sleeve 110, as will be described in more detail herein after. The sleeve 110 generally is initially in a flexible flattened state or condition which is openable to an open state or condition capable of receiving a flower pot or growing medium therein.

The sleeve 110 has an upper end 112, a lower end 114, and an outer peripheral surface 116. The sleeve 110 may be open at the lower end 114 or closed with a bottom at the lower end 114. In a flattened state, the sleeve 110 has a first side 118 and a second side 120. The sleeve 110 also has an inner peripheral surface 122 which, when the sleeve 110 is opened, defines and encompasses an inner retaining space 124 as shown in FIG. 15. When the lower end 114 of the sleeve 110 is closed, a portion of the lower end 114 may be inwardly folded to form one or more gussets (not shown) for permitting a circular bottom of an object such as the flower pot 50, described hereinbefore with reference to FIG. 8, to be disposed in the inner retaining space 124 of the lower end 114 of the sleeve 110.

As shown in FIGS. 14 and 15, the sleeve 110 is demarcated into an upper portion 126 and a lower portion 128. The lower portion 128 of the sleeve 110 is generally sized to contain the flower pot 50. The upper portion 126 of the sleeve 110 is sized to substantially surround and encompass the plant 62 contained in the flower pot 50 disposed within the lower portion 128 of the sleeve 110. The sleeve 110 is demarcated into the upper portion 126 and the lower portion 128 by a detaching element 130 for enabling the detachment of the upper portion 126 of the sleeve 110 from the lower portion 128 of the sleeve 110. In the present version, the detaching element 130 is a plurality of alternating diagonally-oriented perforations which extend circumferentially across the outer peripheral surface 116 of the sleeve 110 from the first side 118 to the second side 120.

In the embodiment shown in FIGS. 14 and 15, the lower portion 128 of the sleeve 110 further comprises a base portion 132 and a skirt portion 134. The base portion 132 of the lower portion 128 of the sleeve 110 comprises that part of the lower portion 128 of the sleeve 110 which, when the flower pot 50 is placed into the lower portion 128 of the sleeve 110, has an inner peripheral surface 122 which is substantially adjacent to and surrounds the outer peripheral surface 56 of the flower pot 50. The skirt portion 134 of the lower portion 128 of the sleeve 110 comprises that part of the lower portion 128 of the sleeve 110 which extends beyond the open upper end 52 of the flower pot 50 and surrounds at least a portion of the plant 62 contained within the flower pot 50 and which is left to freely extend at an angle, inwardly or outwardly, from the base portion 132 when the upper portion. 126 of the sleeve 110 is detached from the lower portion 128 of the sleeve 110.

In the intact sleeve 110, the skirt portion 134 of the sleeve 110 is provided with an upper peripheral edge 135 congruent with the detaching element 130; and the upper portion 126 of the sleeve 110 is provided with a lower peripheral edge 137 which is also congruent with the detaching element 130. In FIGS. 14 and 15, the upper peripheral edge 135 of the skirt portion 134 of the sleeve 110 is congruent with a series of alternating diagonally-oriented lines of perforations which together form a zig-zag and comprise the detaching element 130.

The upper portion 126 of the sleeve 110 may also have an additional detaching element 136 indicated as a plurality of vertical perforations for facilitating removal of the upper portion 126 of the sleeve 110 and which extends between the detaching element 130 of the sleeve 110 and the upper end 112 of the sleeve 110.

The upper portion 126 of the sleeve 110 is thereby separable from the lower portion 128 of the sleeve 110 by tearing the upper portion 126 along both the detaching element 130 and the detaching element 136, thereby separating the upper portion 126 from the lower portion 128 of the sleeve 110. The lower portion 128 of the sleeve 110 remains disposed as the base portion 132 about the flower pot 50 and as the skirt portion 134 about a lower portion of the plant 62 disposed in the flower pot 50, thereby forming a decorative cover 138 as shown in FIG. 16 which substantially surrounds and encompasses the flower pot 50 and a portion of the plant 62 contained therein.

While the detaching elements 130 and 136 have been shown and described herein as being a plurality of perforations, it is to be understood that the term "detaching element" as used herein, means any element, or combination of elements, or features, including perforations, tear strips, zippers, and any other devices or elements or combinations thereof capable of functioning to assist in the removal of the upper portion 126 of the sleeve 110 from the lower portion 128 of the sleeve.

The upper and lower portions 126 and 128 of the sleeve 110 may be formed of a two or three-layered laminated material similar to the sheets of material 10 and 10b described hereinbefore and consisting of a layer of cloth similar to the layers of cloth 12 or 12b and at least one layer of polymeric film similar to the layers or polymeric film 14, 14b and/or 14b'. Alternatively, only the lower portion 128 of the sleeve 110 may be formed of a two-layered material and the upper portion 126 of the sleeve 110 formed of a single layer of material, that is, the lower portion 128 may consist of a layer of cloth 12 or 12b and one or more layers of polymeric film 14, 14b and/or 14b', and the layer of cloth 12 or 12b extends therefrom and forms the upper portion 126 of the sleeve 110 while the layer of polymeric film 14, 14b and/or 14b' is only present in the lower portion 128 of the sleeve 110. Alternatively, only the base portion 132 of the lower portion 128 of the sleeve 110 may be formed of a two-layered material, and the skirt portion 134 of the lower portion 128 as well as the upper portion 126 of the sleeve 110 are formed of a single layer, that is, the layer(s) of polymeric film 14, 14b and/or 14b' may only be present in the base portion 132 of the lower portion 128 of the sleeve 110, while the layer of cloth 12 or 12b is present in both the upper and lower portions 126 and 128 of the sleeve 110. By providing the layer(s) of polymeric film 14, 14b and/or 14b' in only selected portions of the sleeve 110, the areas of the sleeve 110 which are substantially water impermeable can be controlled, while the single layer of cloth 12 or 12b present alone may provide decorative effects different from those observed when the layer(s) of polymeric film 14, 14b and/or 14b' is in contact therewith or laminated thereto.

In a general method of use of sleeve 110 as the decorative cover 138 for the flower pot 50, an operator provides the sleeve 110 and the flower pot 50 having a plant 62 disposed in a growing medium 60 contained within the inner retaining space 58 of the flower pot 50. The operator then manually or automatically disposes the flower pot 50 into the inner retaining space 124 of the sleeve 110, the flower pot 50 being disposed generally through the upper portion 126 of the sleeve 110 into generally the lower portion 128 of the sleeve 110, the flower pot 50 remaining in the lower portion 128 of the sleeve 110, permitting the sleeve 110 to substantially surround and encompass the flower pot 50 and the plant 62 disposed in the flower pot 50. It will be understood that alternatively, the sleeve 110 may be provided with an extension (not shown), and the sleeve 110 may be disposed on rods or wickets, and the flower pot 50 may then be disposed in the sleeve 110 either before or after the sleeve 110 has been removed from the wickets.

As noted above, a bonding material may be disposed on a portion of the sleeve 110 or any sleeve described herein to assist in holding the sleeve 110 to the flower pot 50 when the flower pot 50 is disposed within the sleeve 110 or to assist in closing the upper end 112 of the sleeve 110.

It will be understood that the bonding material, if present, may be disposed as a strip or block on a surface of the sleeve 110. The bonding material may also be disposed upon either the outer peripheral surface 116 or the inner peripheral surface 122 of the sleeve 110, as well as upon the outer peripheral surface 56 of the flower pot 50. Further, the bonding material may be disposed as spots of bonding material, or in any other geometric, non-geometric, asymmetric, or fanciful form, and in any pattern, including covering either the entire inner peripheral surface 122 and/or outer peripheral surface 116 of the sleeve 110 and/or the flower pot 50. The bonding material may be covered by a cover or release strip which can be removed prior to the use of the sleeve 110 or flower pot. The bonding material can be applied by methods known to those of ordinary skill in their art. One method for disposing a bonding material, in this case an adhesive, is described in U.S. Pat. No. 5,111,637, issued to Weder et al. on May 12, 1993, which is hereby expressly incorporated herein by reference.

As noted above, a bonding material may be disposed on at least a portion of the inner peripheral surface 122 of the sleeve 110, or, alternatively, the bonding material may be disposed on the outer peripheral surface 56 of the flower pot 50 contained within the sleeve 110, while the sleeve 110 may be free of the bonding material. In a further alternative, the bonding material may be disposed both on at least a portion of the flower pot 50 as well as upon at least a portion of the inner peripheral surface 122 of the sleeve 110. In addition, a portion of the bonding material may also be disposed on the outer peripheral surface 116 of the sleeve 110 as well. It

Figure 17:
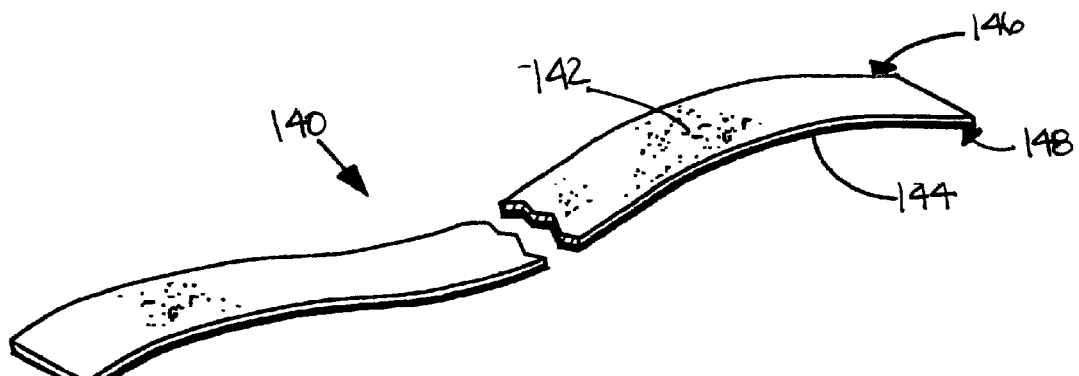
FIG. 17 is a perspective view of a ribbon material formed from a sheet of material constructed in accordance with the present invention.

Description of FIG. 17

Referring now to FIG. 17, designated generally by the reference numeral 140 is a ribbon material constructed in accordance with the present invention. The ribbon material 140 can be wrapped about items and formed into bows and other decorative ornamentations containing ruffles, loops and curved segments. The ribbon material 140 is provided with an upper surface 142 and a lower surface 144. The ribbon material comprises a layer of cloth 146 and a layer of polymeric film 148, wherein the layer of cloth 146 is substantially similar to the layers of cloth 12 and 12b of the sheets of laminated material 10 and 10b, and the layer of polymeric film 148 is substantially similar to the layer of polymeric films 14, 14b and 14b' of the sheets of laminated material 10 and 10b. The layer of cloth 146 and the layer of polymeric film 148 may be laminated together by any method known in the art. In addition, a second layer of polymeric film (similar to the second layer of polymeric film 14b' of the sheet of laminated material 10b described hereinbefore with reference to FIG. 3) may be laminated to the unlaminated surface of the layer of cloth 146 to form a three-layered material.

The ribbon material 140 may be formed from a sheet of material in various ways which are known in the art. For example, the sheet of material may be provided as a roll of material, and material withdrawn from the roll may be passed through a knife assembly having a plurality of cutting elements which cuts the sheet of material into strips having a uniform, predetermined width to form the ribbon material 140.

The ribbon material 140 so produced can then be wound via take up rollers to produce spools of the ribbon material 140 in a conventional manner. It should also be understood that one could produce the sheet of material from which the ribbon material 140 is constructed so that such sheet of material has a width which corresponds to the desired width of the ribbon material 140. In such event, the cutting of the sheet of material to produce the ribbon material 140 can be eliminated. The production of ribbon material from webs or sheets of material is well known. Thus, no further description of the production of the ribbon material 140 from the sheet of material is believed necessary.

Description of FIGS. 18 and 19

Referring now to FIG. 18, designated generally by the reference numeral 150 is a system for producing decorative grass 152 constructed in accordance with the present invention. As shown in FIG. 19, the decorative grass 152 is provided with an upper surface 154 and a lower surface 156. The decorative grass 152 may be formed from any of the sheets of laminated material 10 or 10b described hereinbefore with reference to FIGS. 1–3. Therefore, the decorative grass 152 comprises a layer of cloth 158 and a layer of polymeric film 160, wherein the layer of cloth 158 is substantially similar to the layers of cloth 12 and 12b of the sheets of laminated material 10 and 10b, and the layer of polymeric film 160 is substantially similar to the layer of polymeric films 14, 14b and 14b' of the sheets of laminated material 10 and 10b.

Referring again to FIG. 18, a roll 162 of material formed of the sheets of laminated material 10 or 10b is supported on a mandrel 164 having a brake assembly 166 operably connected thereto so that the material can be controllably withdrawn from the roll 162. The material withdrawn from the roll 162 is passed through a pair of tension or nip rollers 168 and 170 and into a slitter or shredder unit 172 where the material from the roll 162 is slit to provide a slit web of material 174 having a plurality of strips of predetermined width. The slitting of the material from the roll 162 to produce the slit web of material 174 having a plurality of strips of predetermined width can be accomplished using any well known method and device. Such common methods of slitting the material from the roll 162 include: (a) slitting the material to produce side-by-side strips of material wherein the longer dimension of the strips is in the direction of travel of the material, i.e. the machine direction; or (b) slitting the material so that the longer dimension of the strips of material are oblique to the direction of travel of the material, i.e. obliquely to the machine direction.

The slit web of material 174 having a plurality of strips of predetermined width is then passed through a cutting unit 176 where the strips of the slit web of material 174 are cut into segments to form the decorative grass 152. A segment 178 of the decorative grass 152 is illustrated in FIG. 19.

Any conventional device and method can be employed as the slitter or shredder unit 172 and as the cutting unit 176. Examples of conventional devices which can be used as the slitter or shredder unit 172 and/or as the cutting unit 176 are rotary knives, reciprocating knives, die cutting, laser cutting, water jet cutting, air jet cutting and the like.

The decorative grass 152 can then be conveyed to a storage area (not shown) which may be in the form of a suitable bin, or the decorative grass 152 may be conveyed to a packaging machine, or conveyed to a baling machine for baling prior to storage. As other alternatives, the decorative grass 152 may be placed into boxes or cartons, subjected to further processing immediately or held for subsequent processing.

The decorative grass 152 can also be provided with various types of curl configurations, can be crimped or otherwise modified. That is, various types of curls, crimps and combinations thereof can be imparted to the material of the roll 162 prior to slitting the material of the roll 162 to produce the slit web of material 174, or to the slit web of material 174 prior to cutting the slit web of material 174 to produce the decorative grass 152. Any method or apparatus capable of imparting the desired curl and/or crimp to the material of the roll 162 so that the decorative grass 152 produced from such material possess a curl and/or crimped configuration can be employed to impart a curl and/or crimp to the webs of material. Examples of various methods and apparatus which may be used to impart curl configurations to the material of the roll 162 so that the decorative grass 152 produced therefrom possesses a curl configuration are described in co-pending application U.S. Ser. No. 09/591,920, entitled "Method And Apparatus For Making Curled Decorative Grass" which is hereby expressly incorporated herein by reference. Crimping machines capable of imparting the desired crimp to the material of the roll 162 so that the decorative grass 152 produced therefrom possesses a crimped configuration are well known and commercially available. One method for imparting a crimp configuration to the material of the roll 162 so that the decorative grass 152 produced therefrom possesses a crimped configuration is disclosed in U.S. Pat. No. 5,891,286, entitled "Method Of Forming Curled Or Crimped Decorative Elements Having An Optical Effect" issued to Weder on Apr. 6, 1999, which is hereby expressly incorporated herein by reference.

While the sheets of material 10, 10*a* and 10*b* and the materials from which the sleeves 90 and 110, the ribbon material 140 and the decorative grass 152 are constructed are shown and described herein as being formed of a laminate of cloth and polymeric film, in certain applications, if desired, one could utilize a non-laminated material, i.e., a layer of polymeric film and a layer of cloth. Therefore, the present invention is not limited to the use of a laminated material for production of a wrapper of sleeve for a flower pot or floral grouping, a ribbon material or a decorative grass.

Changes may be made in the construction and the operation of the various components, elements and assemblies described herein or in the steps or the sequence of steps of the methods described herein without departing from the spirit and scope of the invention as defined in the following claims.

What is claimed:

1. A decorative grass produced by cutting a laminated material into segments having a predetermined width, the laminated material comprising:
    a layer of cloth selected from the group consisting of woven fabric, nonwoven fabric, welded fabric, spun-bonded fabric, knitted fabric, pressed fabric and combinations and blends thereof; and
    a layer of polymeric film having at least a portion of one surface thereof laminated to the layer of cloth.

2. The decorative grass of claim 1 wherein the layer of cloth has a thickness in a range of from about 0.5 mil to about 30 mil, and the layer of polymeric film has a thickness in a range of from about 0.5 mil to about 30 mil.

3. The decorative grass of claim 1 wherein the layer of polymeric film is selected from the group consisting of polyethylene, polypropylene, polyvinyl chloride, cellophane, expanded core polymeric film, and combinations thereof.

4. A decorative grass produced by cutting a laminated material into segments having a predetermined width, the laminated material comprising:
    a layer of cloth having an upper surface and a lower surface, the layer of cloth being selected from the group consisting of woven fabric, nonwoven fabric, welded fabric, spun-bonded fabric, knitted fabric, pressed fabric and combinations and blends thereof;
    a first layer of polymeric film having at least one surface thereof laminated to the upper surface of the layer of cloth; and
    a second layer of polymeric film having at least one surface thereof laminated to the lower surface of the layer of cloth.

* * * * *